United States Patent [19]

Ikegaya et al.

[11] Patent Number: 5,121,895
[45] Date of Patent: Jun. 16, 1992

[54] POWER SEAT LIFT ARRANGEMENT FOR AUTOMOTIVE SEAT WITH COMPACT CONSTRUCTION ENABLING LOWERING OF HIP POINT

[75] Inventors: Isao Ikegaya; Tadashi Matsumoto, both of Shizuoka, Japan

[73] Assignee: Fuji Kiko Company Limited, Japan

[21] Appl. No.: 485,626

[22] Filed: Feb. 27, 1990

[30] Foreign Application Priority Data

Feb. 27, 1989 [JP] Japan .................. 1-45717[U]

[51] Int. Cl.⁵ .......................................... F16M 13/00
[52] U.S. Cl. ................................ 248/420; 248/430; 297/346
[58] Field of Search ............... 248/419, 420, 421, 422, 248/429, 430; 297/346

[56] References Cited

U.S. PATENT DOCUMENTS

| | | | |
|---|---|---|---|
| 2,929,439 | 3/1960 | Tanaka et al. | 248/421 X |
| 3,155,363 | 11/1964 | Lohr | 248/419 |
| 3,181,831 | 5/1965 | Posh | 248/421 |
| 3,437,302 | 4/1969 | Homier | 248/420 X |
| 3,894,708 | 7/1975 | Stanley | 248/421 X |
| 4,309,015 | 1/1982 | Muhr | 248/422 X |
| 4,756,503 | 7/1988 | Fujita | 248/430 |

*Primary Examiner*—David L. Talbott
*Attorney, Agent, or Firm*—Ronald P. Kananen

[57] ABSTRACT

A power seat lifter arrangement has a drive mechanism for driving a seat cushion for adjustment of the height level, which drive mechanism is mounted on an upper rail of a seat slide. The drive mechanism is separated into two parts, one is for adjusting the height level at the front portion of the seat cushion, and the other is for adjusting the height level at the rear portion of the seat cushion.

11 Claims, 17 Drawing Sheets

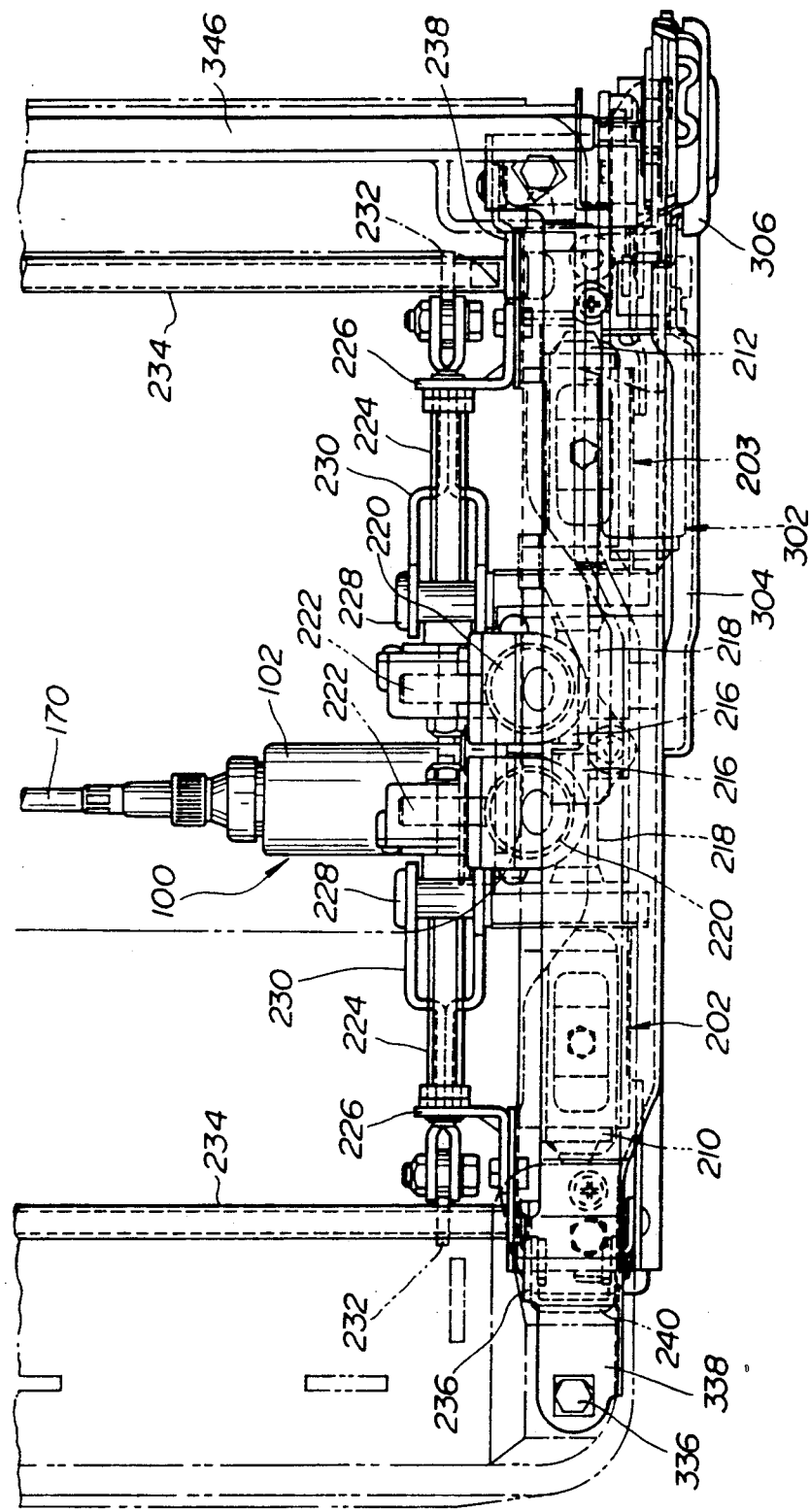

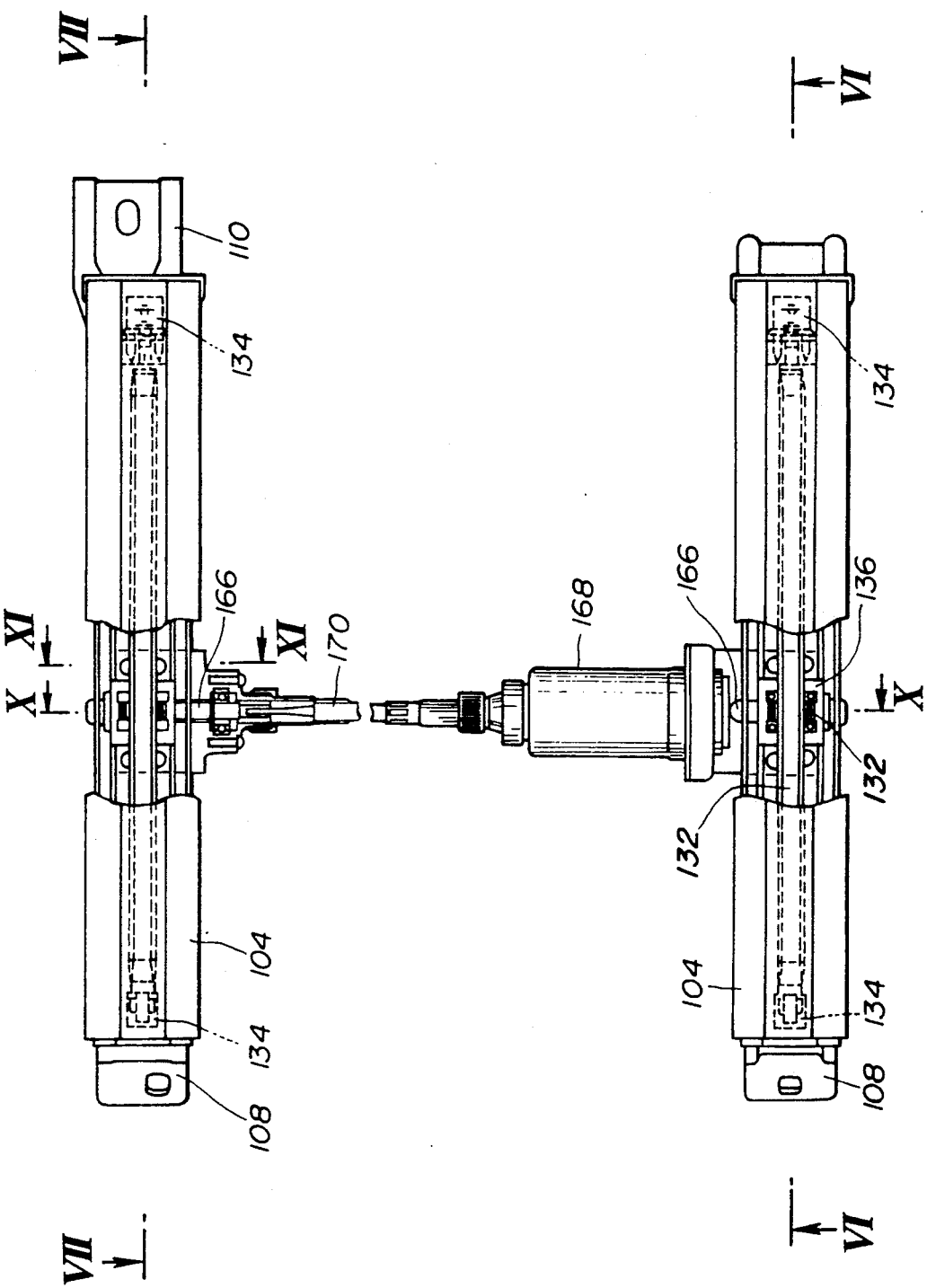

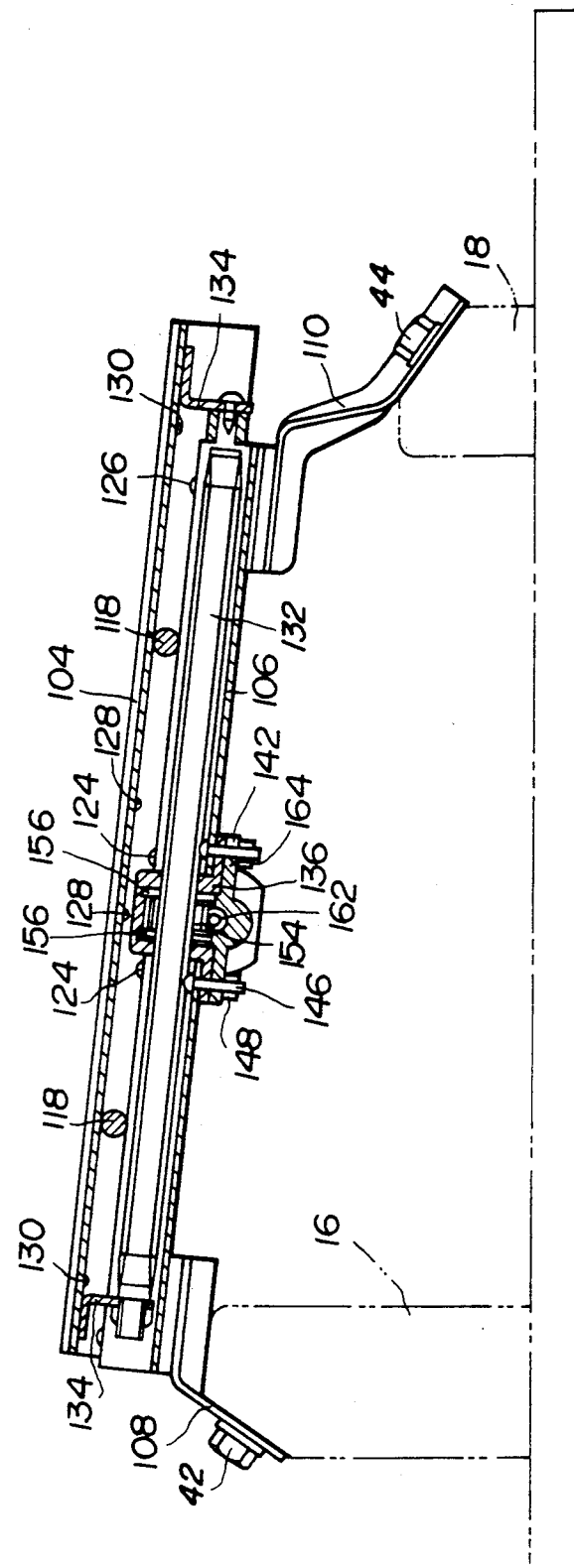

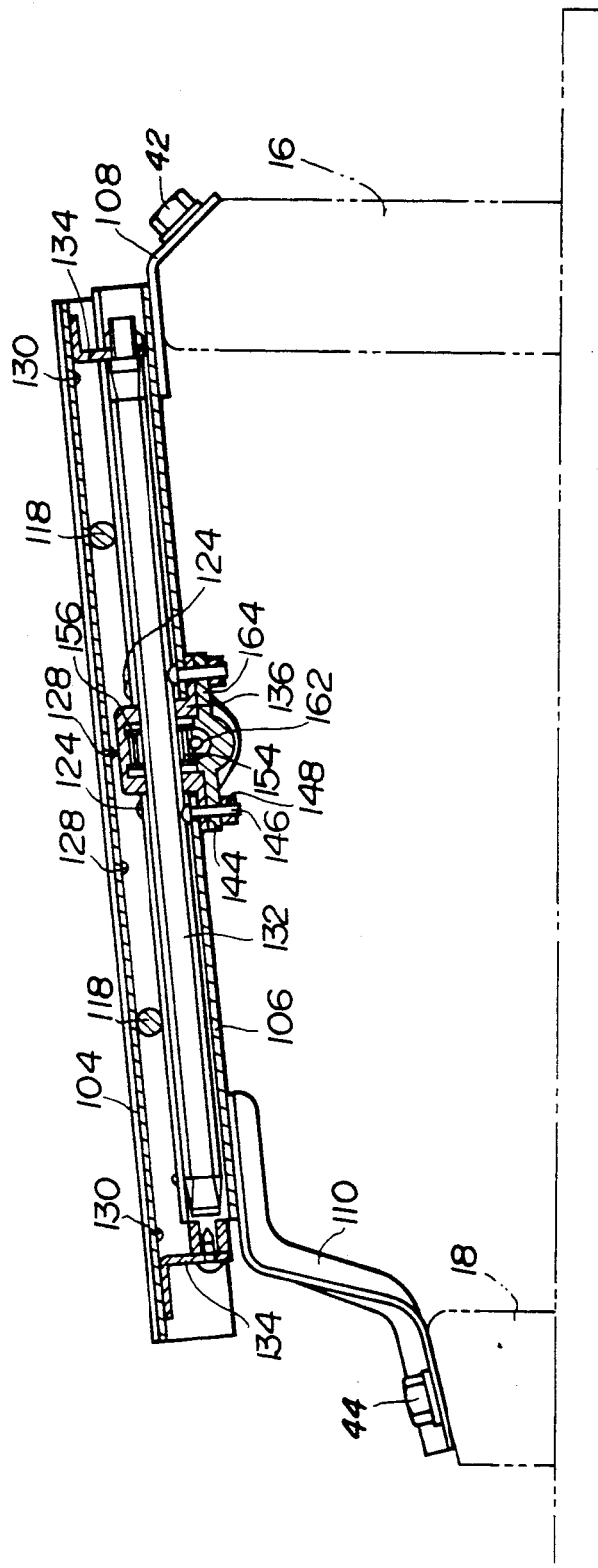

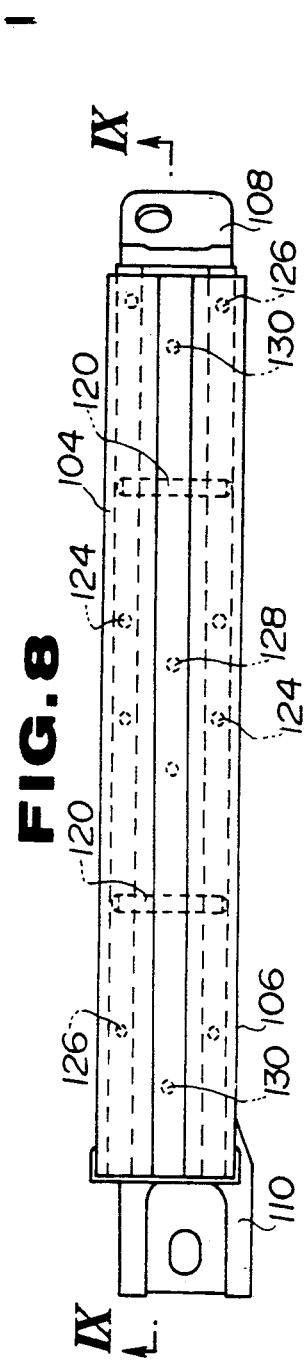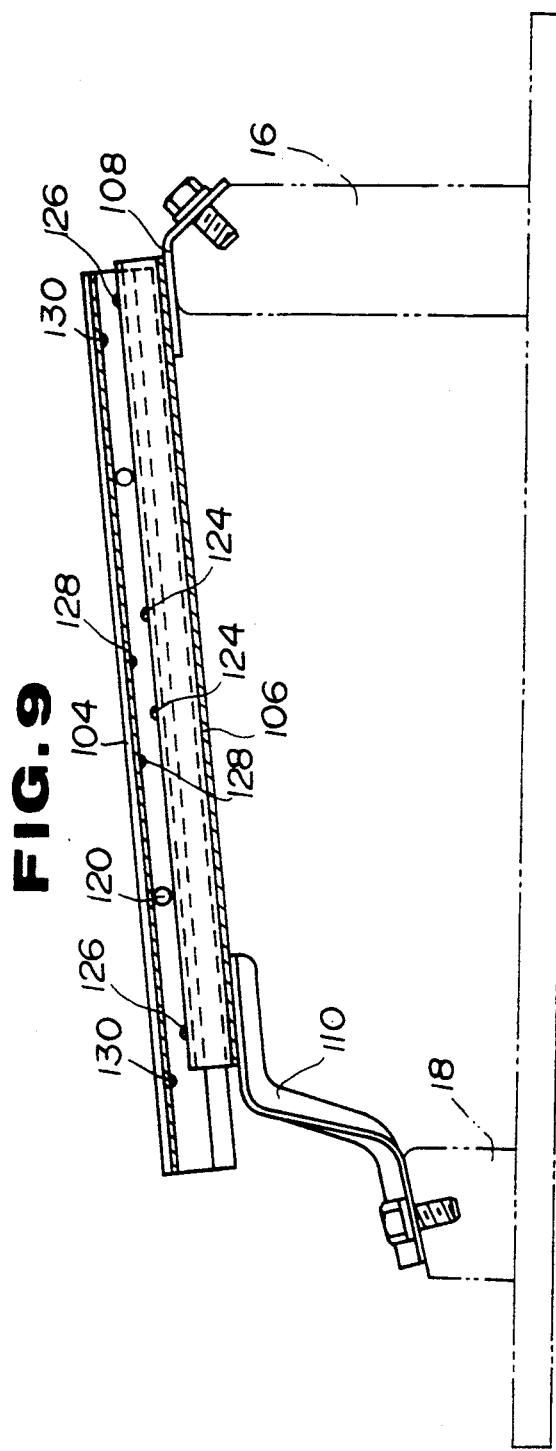

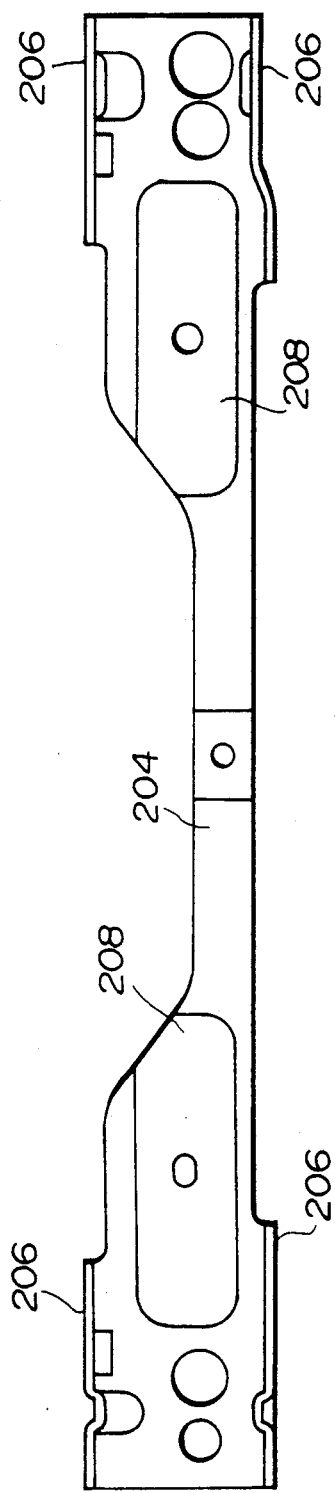
FIG.22
FIG.23

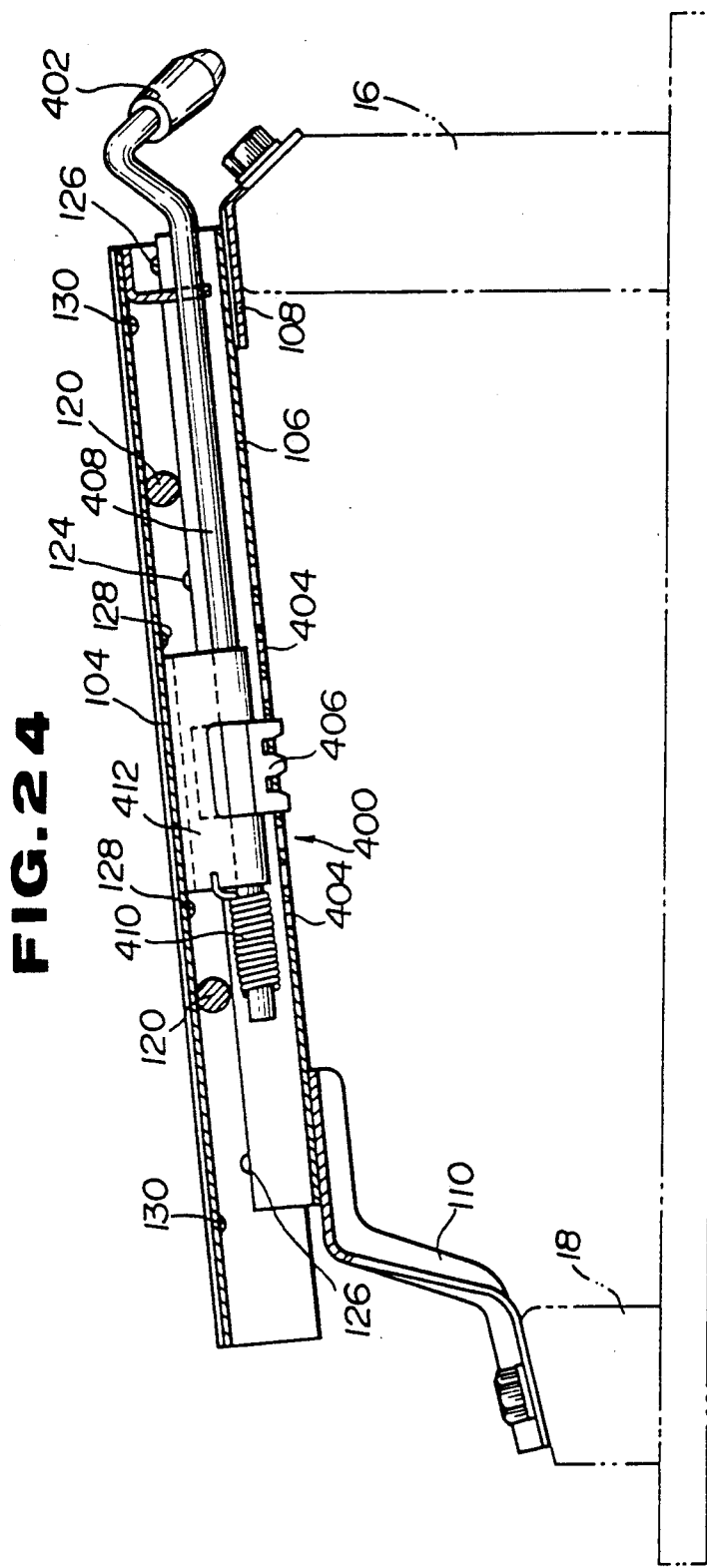

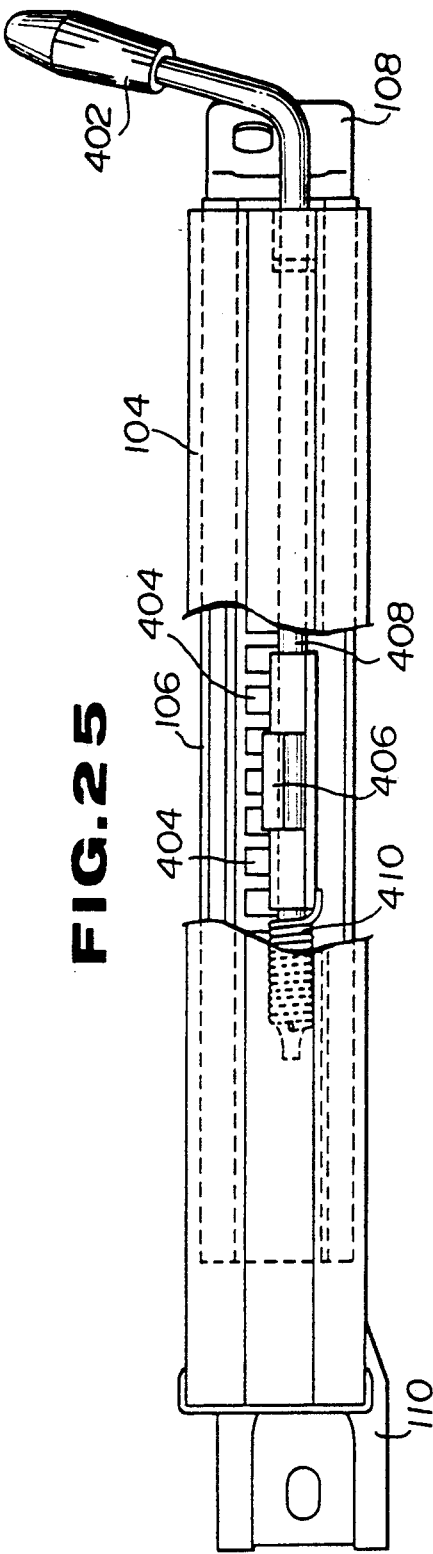

POWER SEAT LIFT ARRANGEMENT FOR AUTOMOTIVE SEAT WITH COMPACT CONSTRUCTION ENABLING LOWERING OF HIP POINT

BACKGROUND OF THE INVENTION

1. Field of the Invention

The present invention relates generally to an automotive power seat. More specifically, the invention relates to an electrically powered seat lifter arrangement which is constructed compact enough for enabling a lower seat cushion elevation so as to achieve a lower hip point.

2. Description of the Background Art

Automotive power seat arrangements have been facilitated in various automotive vehicles for convenience of seat positions, such as a seat slide position, a seat cushion height position, a seat back reclining position, and so forth. In order to facilitate various seat position adjusting functions, the power seat arrangement is provided with various seat position adjusting mechanisms, such as a seat slide mechanism, a seat lifter mechanism, a reclining mechanism, and so forth. These adjusting mechanisms are driven by driving means such as electric motors. The driving mechanisms are provided in the vicinity of the associated adjusting mechanisms. Since only a quite limited space is available around the vehicular seat to place the driving means, difficulty is encountered in placing the driving means.

It is a general practice to place the driving means beneath the seat cushion of the seat. This clearly requires enough height or space beneath the seat cushion. As a result, the height of the seat cushion is prevented from lowering. On the other hand, in certain types of vehicles, it is preferred to have a seat position of the vehicular occupant as low as possible. In such case, the driving means placed beneath the seat cushion serves as a border preventing the seat cushion from being satisfactorily lowered.

SUMMARY OF THE INVENTION

Therefore, it is an object of the present invention to provide a power seat lifter arrangement for an automotive seat, which can minimize a limitation for lowering of a seat cushion position.

Another object of the present invention is to provide a power seat lifter arrangement which enables independent and synchronous adjustment of the height position of front and rear portions of the seat cushion.

In order to accomplish the aforementioned and other objects, a power seat lifter arrangement, according to the present invention, has a drive mechanism for driving a seat cushion for adjustment of the height level, which drive mechanism is mounted on an upper rail of a seat slide. The drive mechanism is separated into two parts; one is for adjusting the height level at the front portion of the seat cushion, and the other is for adjusting the height level at the rear portion of the seat cushion.

According to one aspect of the invention, an adjustable automotive seat arrangement including a seat cushion and a seat back comprises:

a seat slide mechanism associated with said seat cushion for permitting axial shifting in frontward and rearward directions, said seat slide mechanism including a seat slide rail structure having a stationary rail secured to a vehicular body structural member and a movable rail slidingly engaged with said stationary rail and secured to a structural member of said seat cushion, said movable rail being associated with a first driving means for driving said movable rail relative to said stationary rail;

a seat lifter mechanism associated with said seat cushion for adjusting the height position of said seat cushion, said seat lifter mechanism including a stationary framework connected to a seat cushion frame of said seat cushion via a link mechanism, wherein said seat lifter mechanism includes a second driving means associated with said link mechanism for driving the link mechanism for causing vertical movement of said seat cushion frame relative to said stationary framework; and said second driving means being mounted on said movable rail of said seat slide.

The link mechanism may comprise a first link mechanism associated with the front portion of said seat cushion and a second link mechanism associated with the second portion of said seat cushion, and said second drive means comprises a first component associated with said first link mechanism and a second component associated with said second link mechanism, said first and second components being oriented in alignment along said movable rail. Each of said first and second components comprises an electric motor, a screw shaft associated with said electric motor to be rotatingly driven by the driving force of the latter and extending in a parallel relationship with said movable rail, and a movable nut drivingly associated with the corresponding one of said first and second link mechanism and engaging with said screw shaft to be driven by the rotation thereof. Each of said first and second mechanisms may comprise a first link member pivotally connected to said movable nut at one end, a second link member pivotally connected to the seat cushion frame at one end, a third link member pivotally connected to a respective one of the other ends of said first and second link members, said first, second and third link members being so combined as to convert the thrusting movement of said movable nut along said screw shaft into a vertical movement of said seat cushion.

The seat slide mechanism may include a threaded shaft secured to said movable rail and disposed within the internal space between said movable rail and said stationary rail, a stationary block having a gear element having gear teeth meshing with said threaded shaft and a power train for transmitting a rotational driving torque of said first driving means to said gear element for rotatingly driving the latter. The seat slide rail structure may include means for establishing a three point support for slidingly supporting said movable rail on said stationary rail for smooth sliding movement of said movable rail relative to said stationary rail. Preferably, the movable rail and the stationary rail are provided with overlapping sections extending along both lateral sides, and the three point support is established by means of a roller bearing contacting with mating faces of the movable rail and the stationary rail with low frictional sliders disposed between the movable and stationary rails at the overlapping sections.

At least one of the movable and stationary rails may be provided with stopper projections for restricting the range of motion of said roller bearings. The first and second roller bearings are disposed between the movable and stationary rails and the stopper projections which comprise a first pair of projections associated with the first roller bearing for restricting the motion range of the first roller bearing within a predetermined range within a front half of the stationary rail and a second pair of projections associated with the second roller bearing for restricting the motion range of the second roller bearing within a predetermined range within a rear half of the stationary roller.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIG. 4 is a partial plan view of the preferred embodiment of the automotive power seat arrangement of FIG. 1;

FIG. 5 is a plan view of the preferred construction of a seat slide mechanism employed in the preferred embodiment of the automotive power seat arrangement of the invention;

FIG. 6 is a section taken along line VI—VI of FIG. 5;

FIG. 7 is a section taken along line VII—VII of FIG. 5;

FIG. 8 is a plan view of a seat slide rail of the preferred construction of the seat slide mechanism of FIG. 5;

FIG. 9 is a section taken along line IX—IX of FIG. 8;

FIG. 22 is a plan view of a support frame member employed in the seat lifter mechanism of FIG. 21

FIG. 23 is a side elevation of a support frame member employed in the seat lifter mechanism of FIG. 21

FIG. 24 is a section of a manually operable seat slide mechanism which employs a seat slide lock structure equivalent to that of the preferred embodiment of the power seat arrangement;

FIG. 25 is a plan view of the seat slide mechanism of FIG. 24; and

FIG. 26 is a cross section of the seat slid mechanism of FIG. 24.

DESCRIPTION OF THE PREFERRED EMBODIMENT

Figure 1:
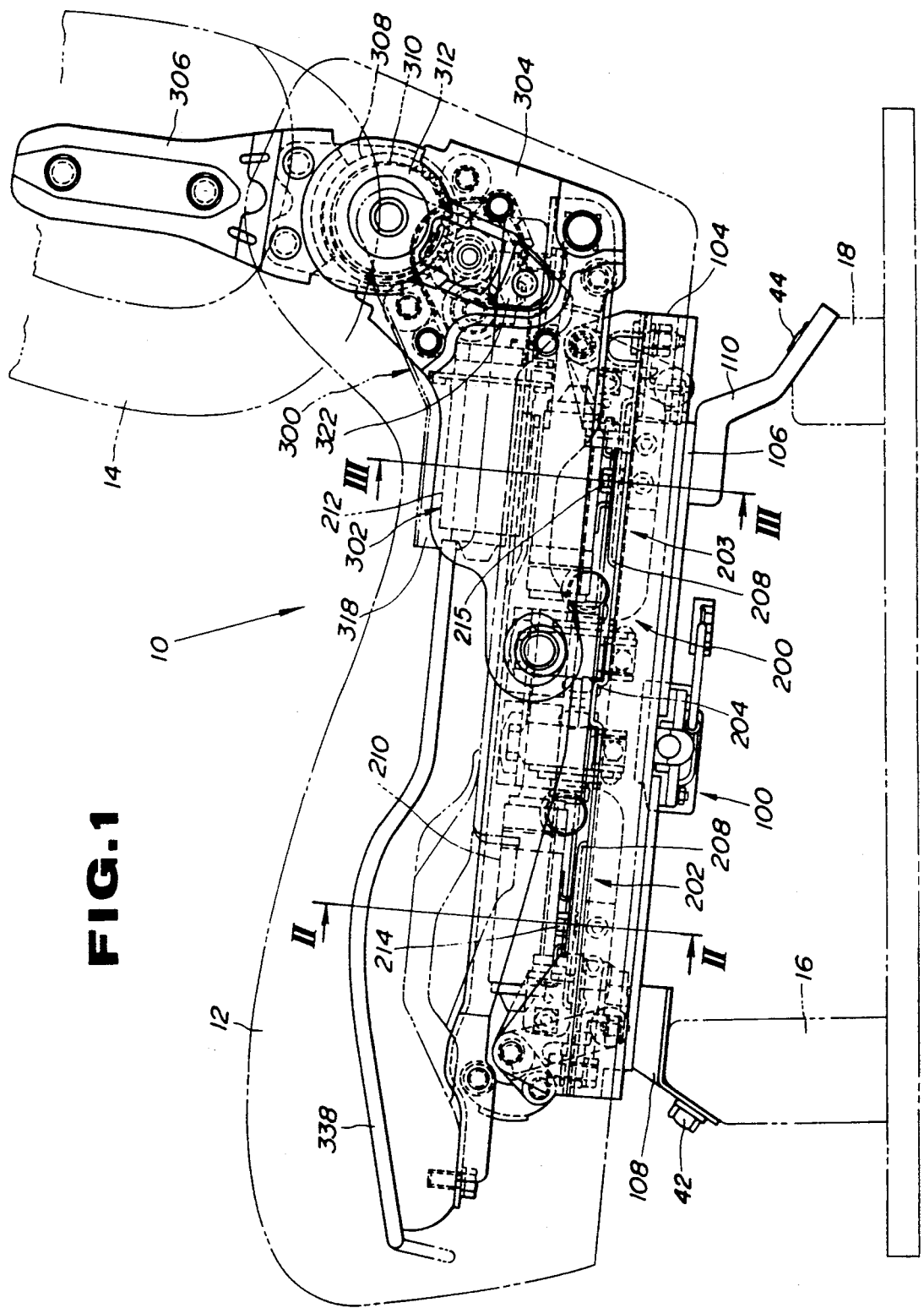
FIG. 1 is a side elevation of the preferred embodiment of an automotive power seat arrangement according to the present invention.
Figure 2:
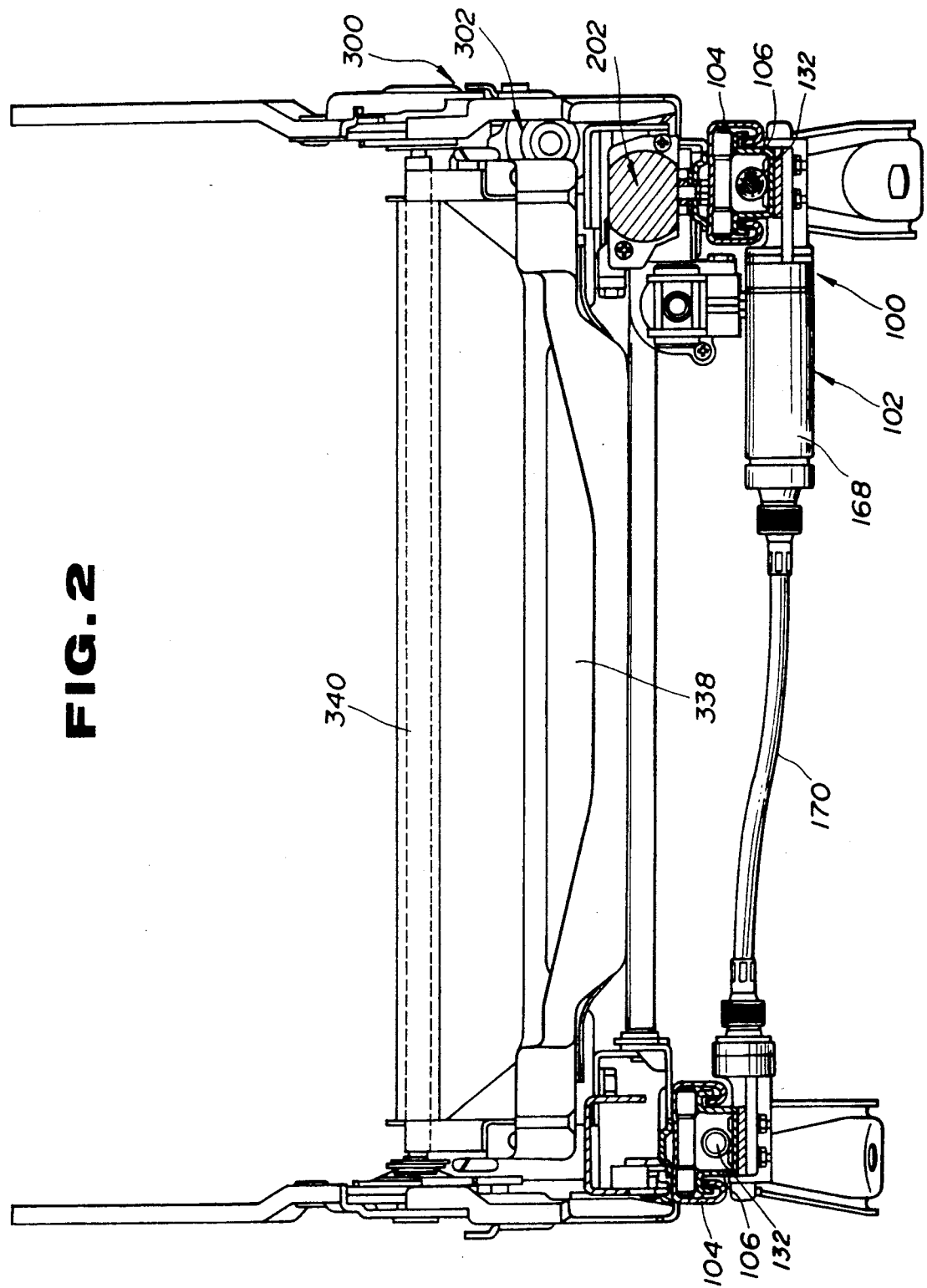
FIG. 2 is a section taken along line II—II of FIG. 1.
Figure 3:
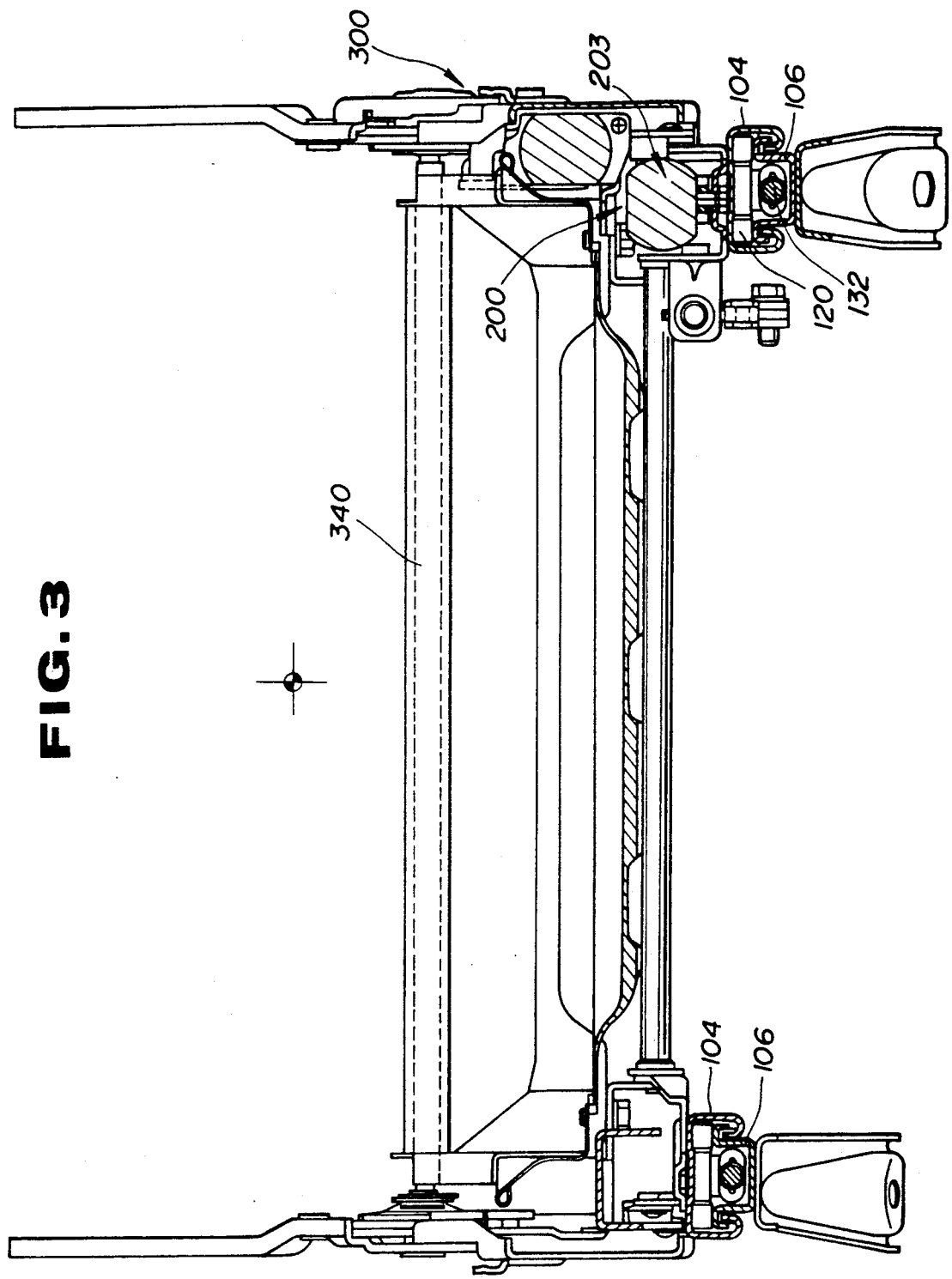
FIG. 3 is a section taken along line III—III of FIG. 1.
Figure 10:
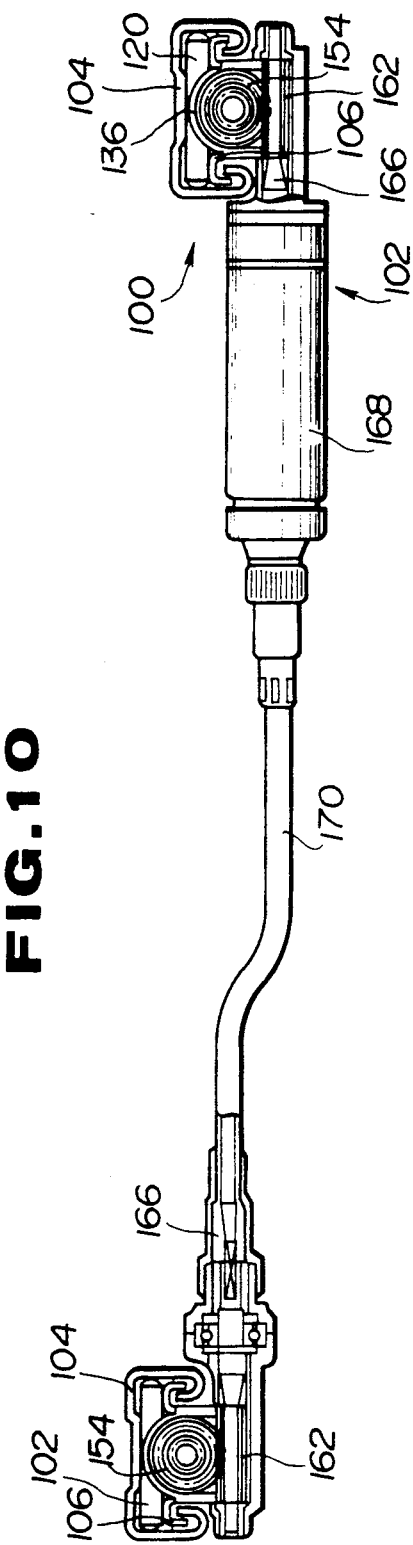
FIG. 10 is a section taken along line X—X of FIG. 5.
Figure 11:
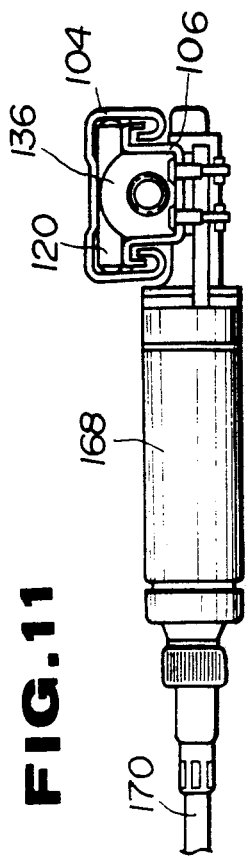
FIG. 11 is a section taken along line XI—XI of FIG. 5.

Referring now to the drawings, particularly to FIGS. 1 through 4, the preferred embodiment of a power seat arrangement, according to the present invention, includes a power seat slide mechanism 100, a power seat lifter mechanism 200 and a power reclining mechanism 300. The seat slide mechanism 100 is designed for shifting a vehicular seat 10 in forward and backward directions. The seat lifter mechanism 200 is designed for vertically shifting a seat cushion 12 of the seat 10. The reclining mechanism 300 is designed for adjusting the angular position of a seat back 14 relative to the seat cushion 12. The seat slide mechanism 100 is associated with a seat slide drive system which is generally represented by the reference numeral 102. The seat lifter mechanism 200 is associated with seat lifter drive systems 202 and 203. Similarly, the seat back reclining drive system 302 is provided for the reclining mechanism 300.

The seat slide mechanism 100 has a pair of guide rail structures extending substantially in parallel to the longitudinal axis of the vehicle body. Each of the guide rail structure includes an upper rail 104 and a lower rail 106. The lower rail 106 is stationary secured onto cross members 16 and 18 of the vehicular body framework by means of brackets 108 and 110 which are rigidly secured to the cross members by means of the fastening bolts 42 and 44. On the other hand, the upper rail 104 is rigidly fixed to a seat frame of the seat cushion 12 for movement therewith. The upper rail 104 is slidably engaged with the lower rail 104 for axial movement in forward and backward directions.

Figure 12:
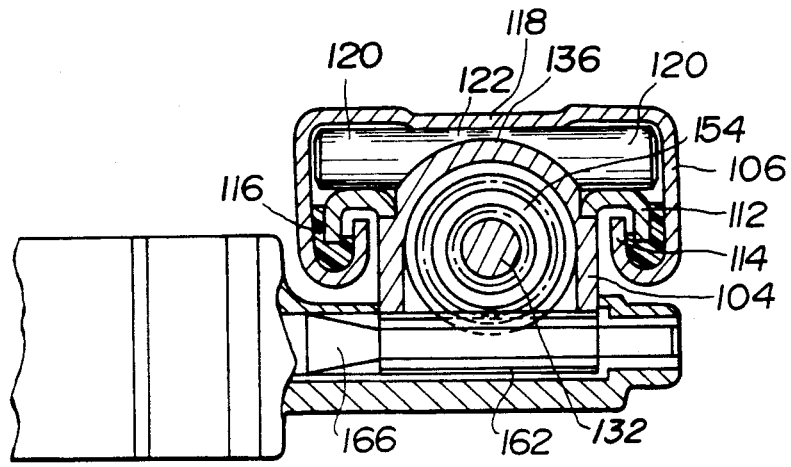
FIG. 12 is an enlarged section showing major part of FIG. 10.
Figure 13:
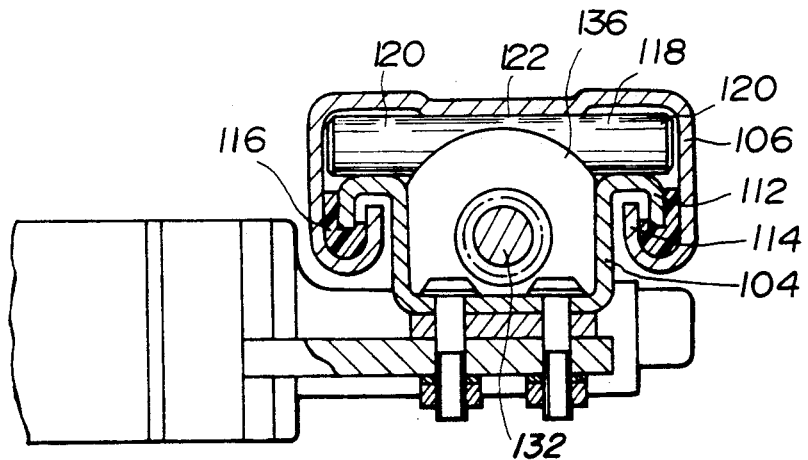
FIG. 13 is an enlarged section showing major part of FIG. 11.

As can be particularly seen from FIGS. 12 and 13, the lower rail 106 is generally of a channel shaped cross section to have a pair of curled flange sections 112 which extend longitudinally along the upper end of the channel shaped major section. On the other hand, the upper rail 104 is provided with curled flange sections 114. A slider 116 formed of a self-lubricating or low friction material, such as a synthetic resin, is secured to each of the flange sections 114 of the upper rail 104. The slider 116 is placed in contact with the inner face of the associated flange section 112 of the lower rail 106. A pair of roller bearings 118 are disposed in the internal space defined by the upper and lower rails 104 and 106. The roller bearing 118 has side portions 120 contacting with the upper edge of the lower rail 106 and a smaller diameter center portion 122 contacting with the lower face of the stepped down center portion of the horizontally extending section of the upper rail 104. A pair of stopper projections 124 are formed in the vicinity of a longitudinal center portion of the lower rail 106. These stopper projections 124 restrict movement of the roller bearing 118 so that one of the roller bearings 118 is oriented in the front half section of the lower rail 106 and the other roller bearing is oriented in the rear half of section, as shown in FIGS. 6 and 7. Another pair of stopper projections 126 are provided in the vicinity of a front and a rear end of the lower rail 106 for preventing the roller bearings 118, from being lost through the axial ends. The upper rail 104 is also provided with projections 128 in the vicinity of the longitudinal center and at a corresponding orientation to that of the projections 124 of the lower rail 106 when the upper rail 104 is placed at the initial position. The upper rail 104 is also provided with the projections 130 at the corresponding orientations to the projections 126 when the lower rail 106 is placed at the initial position. These projections 128 and 130 cooperate with the projections 124 and 126 of the lower rails 106 so as to restrict the range of movement of the roller bearings 118. The slider 116 and roller bearings 118 assure smooth movement of the upper rail 104 relative to the lower rail 106.

Figure 17:
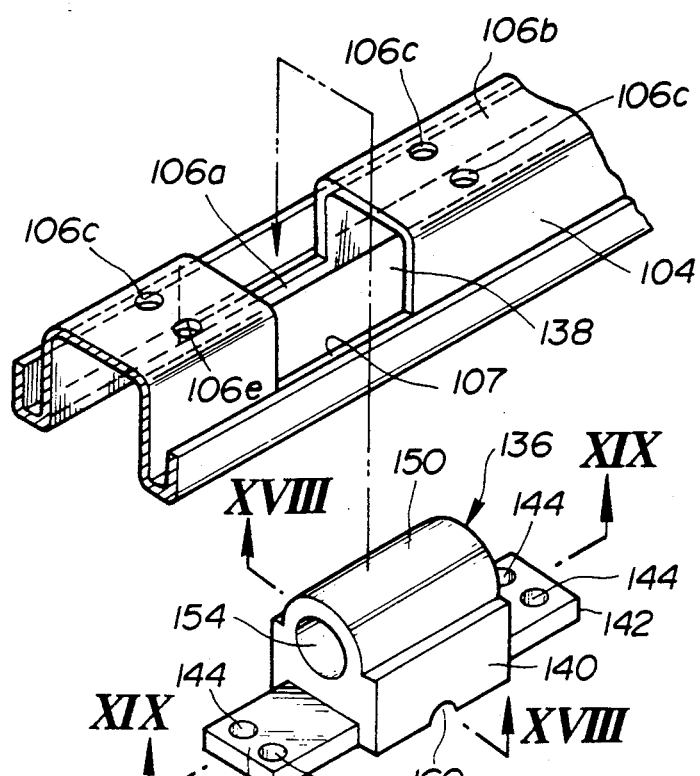
FIG. 17 is an exploded perspective illustration of the seat slide guide structure employed in the seat slide mechanism of FIG. 5.
Figure 18:
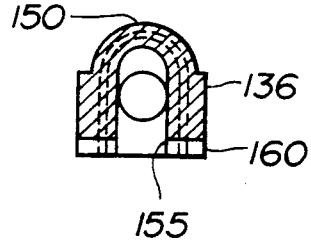
FIG. 18 is a section taken along line XVIII—XVIII of FIG. 17.
Figure 19:
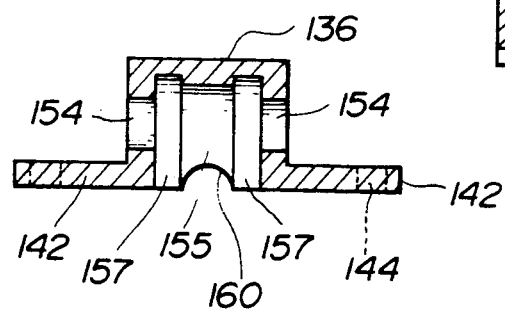
FIG. 19 is a section taken along line XIX—XIX of FIG. 17.

A screw shaft 132 extends through the center portion of the lower rail 106. The screw shaft 132 is secured to the upper rail 104 at both ends thereof by means of brackets 134. Therefore, the screw shaft 132 is movable relative to the lower rail 106 together with the upper rail 104. The screw shaft 132 extends through a nut block 136 which is fixed to the lower rail 104. As can be seen from FIGS. 6 and 7, the nut block 136 is longitudinally oriented between the stopper projections 124. As shown in FIG. 17, the nut block 136 is received in the lower rail 106 through a cut-out 138. A vertically extending wall section 140 of the nut block 136 are adapted to firmly contact with the vertical wall section 106a of the lower rail 106. The nut block 136 also has a pair of longitudinally extending flanges 142 which are to be placed in mating engagement with the lower surface of the horizontal wall section 106b with aligning holes 144 in register with the holes 106c formed through the horizontal wall section 106b of the lower rail 106. The nut block 136 is rigidly secured onto the lower rail 106 by means of bolts 146 and nuts 148. The nut block 136 has a round top portion 150 through which a bore 152 is defined. A nut 154 is loosely disposed within the bore for threadingly engaging with the screw shaft 132 so that the nut may rotate relative to the bore. The nut 154 is received within a lower end opened groove 155 formed on the inner periphery of the bore 152 and further restricted axial movement by means of thrust bearings 156 at both axial sides thereof, which thrust bearings 156 are received within a lower end opened groove 157.

The vertical extending wall section 140 of the nut block 136 is formed with a sectionally semi-circular shaped groove 160 which is in communication with the groove 155. Through the groove 160, a worm gear 162 is received. The worm gear 162 engages with a thread formed on the outer periphery of the nut 154. The worm gear 162 is supported with maintaining engagement with the thread on the outer periphery of the nut 154 by means of a bearing member 164.

A worm gear 162 is mechanically connected to an output shaft 166 of an electric motor 168 which serves as the seal slide driving means as shown in FIG. 5. The electric motor 168 comprises a reversible motor so as to be driven in a forward and a backward directions for driving the worm gear 162 accordingly. One of the output shaft 166 oriented at a position remote from the motor 168 is connected to the motor via a flexible shaft 170.

Figure 14:
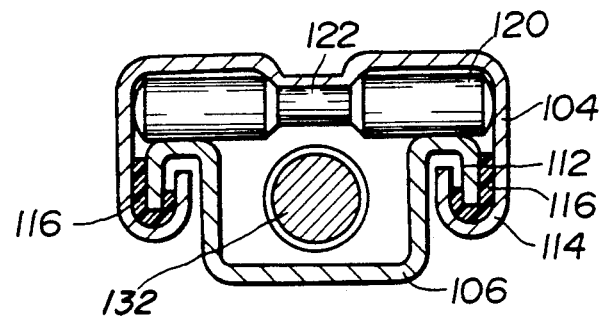
FIGS. 14, 15 and 16 are sections respectively showing modification of the seat slide guide structure to be employed in the preferred construction of the power seat arrangement.
Figure 15:
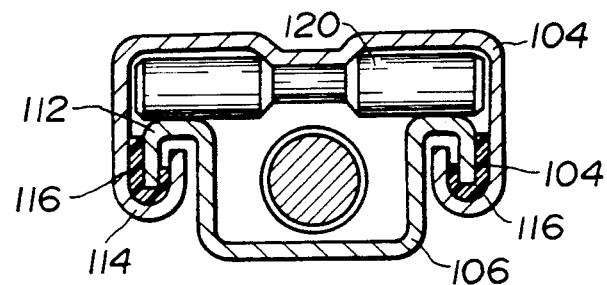
Figure 16:
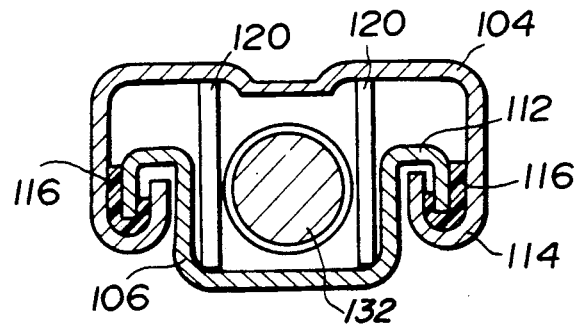

It should be appreciated that the configuration of the upper rail 104 and the roller bearings 118 can be modified in various ways. Examples are shown in FIGS. 14, 15 and 16.

Figure 21:
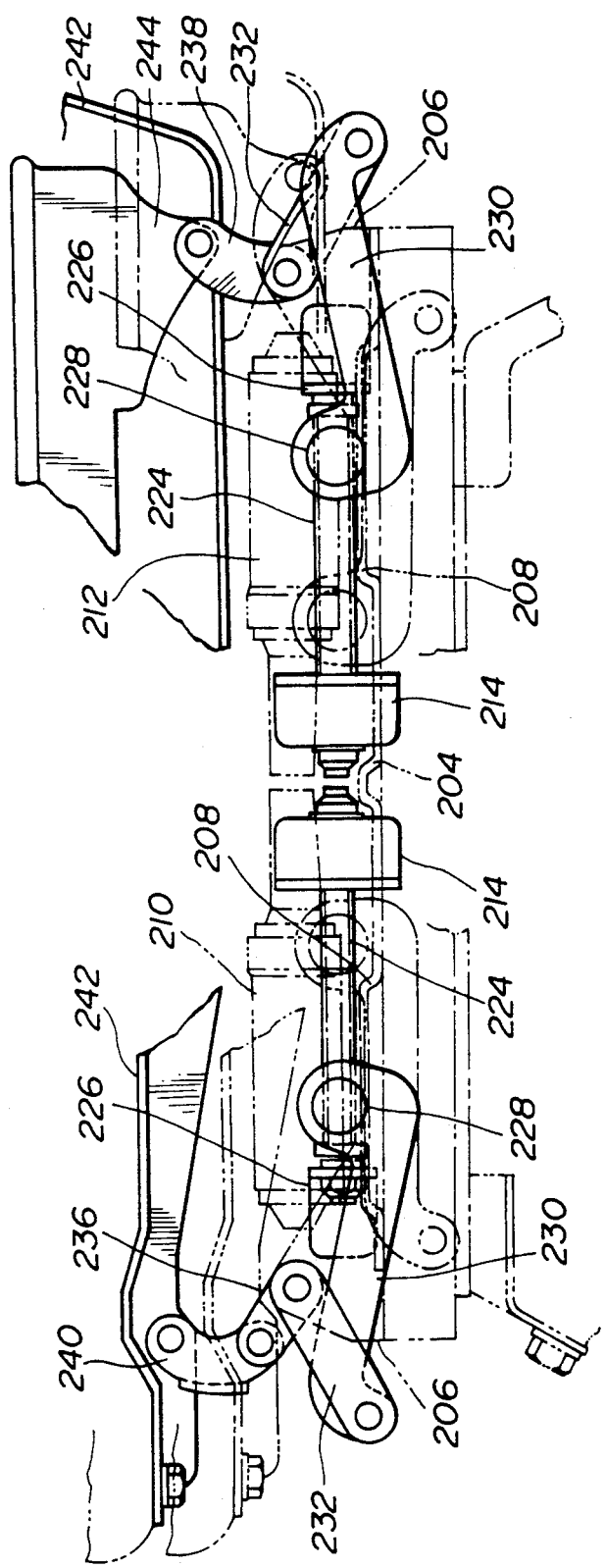
FIG. 21 is a side elevation of the preferred construction of a seat lifter mechanism employed in the preferred embodiment of the power seat arrangement.

The seat lifter mechanism 200 includes support frame members 204 respectively mounted on the upper rails 104 and secured thereon top by means of fastening bolts as shown in FIG. 21. The support frame member defines a motor receptacle space by vertical wall sections 206. The horizontal section of the motor receptacle space is bent upwardly to form motor supports 208. Electric motors 210 and 212 are fixed on the motor supports 208 by means of fastening bolts 214. As can be seen from FIG. 1, the electric motors 210 and 212 are arranged in axial alignment to each other. Each of the electric motors 210 and 212 is associated with a worm gear unit 215. As shown in FIG. 4, the worm gear unit 215 has worm gear 216 secured onto the output shaft 218 of the each electric motor 210 and 212. The worm gear 216 meshes while a worm wheel 220 which is in turn, associated with a gear train including gears 222. The gears 222 are firmly secured on respectively opposing ends of screw shafts 224. Each screw shaft 224 is rotatably supported by means of a bracket 226. A nut block 228 is engaged to the screw shaft 224 for axial movement according to rotation of the latter. The nut block 228 is connected to a yoke shaped link member 230. The link member 230 is pivotably connected to the nut block 228 at one end for pivotal movement thereabout. On the other hand, the link member 230 is pivotally connected to one end of an intermediate link member 232. The other end of the intermediate link member 232 is rigidly connected to a coupling lever 234 which is rotatably supported on the support frame member 204. Links 236 and 238 are rigidly secured onto both ends of the coupling lever 234 at a predetermined angular relationship thereto. The link 236 is oriented in the vicinity of the front end of the seat and pivotally connected to one end of a link 240, the other end of the which is pivotally connected to the seat frame 242. On the other hand, the link 238 has the other end pivotally connected to the downward extension 244 of the seat frame 242. As will be appreciated, the link mechanisms are provided at both sides of the seat and cooperated with each other via the coupling levers 234 for assuring synchronous operation according to the position, of the nut blocks 228 relative to the screw shafts 224.

Figure 20:
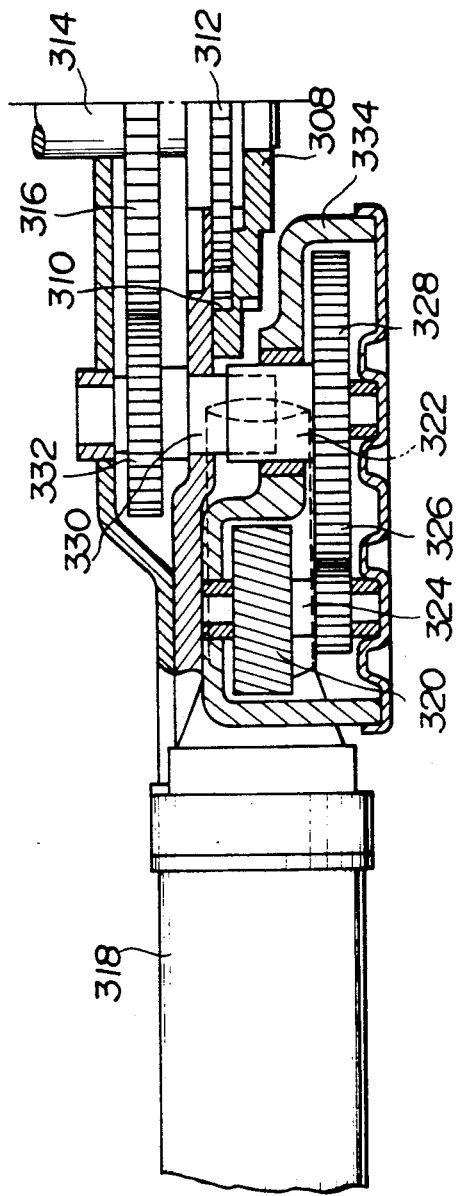
FIG. 20 is a section showing major part of a seat back reclining mechanism in the preferred embodiment of the power seat arrangement.

The seat back reclining mechanism 300 includes base plates 304 respectively fixed to the rear end of the seat frame 242. To each of the base plates, a back arm 306 is pivotally connected, as shown in FIGS. 1 and 4. The back arm 306 has a lower end portion 308 formed with an internal gear 310, about which an eccentric gear 312 having external gear teeth is meshed. The eccentric gear 312 is rotatably driven for eccentrically driving the internal gear and thereby pivotally drives the back arm 306 for gradually adjusting the reclining angle of the seat back. As shown in FIG. 20, the eccentric gear 312 is supported by a gear shaft 314 which is rotatable together with the eccentric gear. A driver gear 316 is also secured on the gear shaft 314 for rotation therewith. The driver gear 316 is designed to be driven by a driving torque of an electric motor 318 transmitted through a gear train. The gear train includes a worm gear 320 which meshes with a worm gear 322 rigidly secured to the output shaft of the motor 318 in order to convert the rotating direction. The worm gear 320 is secured to a rotary shaft 324. A small diameter gear 326 is also secured on the rotary shaft 324. The smaller diameter gear 326 meshes with a larger diameter gear 328 which is secured on a rotary shaft 330. A transmission gear 332 is secured to the rotary shaft 330 for rotation therewith. The transmission gear 332 is drivingly engaged with the driver gear 316. With the shown gears, a speed reduction gear train is formed. Therefore, the driving torque of the electric motor 318 is transmitted to the back arm 306 with a reduced speed.

The gear train set forth above is housed within a gear train housing 334 which rotatably supports the rotary shafts 324 and 330. The electric motor 318 is received within a motor receptacle 336 of a seat pan 338.

As will be appreciated, the seat back reclining mechanisms are provided on both sides of the seat. These pair of reclining mechanisms cooperate through a connecting rod 340 which assures synchronous operation of both of the reclining mechanisms.

In the shown construction, the electric motors 168, 210, 212 and 318 are respectively connected to a seat slide switch, a seat lifter switch, and a reclining switch arranged in the vicinity of the seat for permitting adjustment of the seat position.

When the seat slide switch is operated, electric power is supplied to the electric motor 168 for driving the latter in a forward or a reverse direction according to the desired shifting direction of the seat. Rotation of the output shaft 166 of the electric motor 168 is transmitted to the worm gear 162. According to rotation of the warm gear 162, the nut 154 is rotatingly driven to cause axial movement of screw shaft 132 with respect to the nut block 136. Since the screw shaft 132 is rigidly secured to the upper rail 104, the upper rail with the seat is axially driven for adjusting the seat slide position.

During the seat slide operation set forth above, smooth movement of the upper rail 104 relative to the lower rail 106 is assured by the roller bearing 118 and the slider blocks 116. The projections 124 and 126 of the lower rail 106 and the projections 128 and 130 are cooperative with the roller bearing 118 for serving as a stopper for restricting forward and backward movement of the upper rail relative to the lower rail.

On the other hand, when the seat lifter switch is operated, the electric motors 210 and 212 are operated in unison or independently of each other. The electric motors 210 and 212, as driven, drive the worm gears 220 via the worm gear 222. The worm gear 220 transmits the driving torque of the associated one of the electric motors 210 and 212 to the associated one of the screw shafts 224. Since the nut block 228 is engaged to the screw shaft 224 and held stationarily, rotation of the screw shaft causes axial movement thereof. As a result, respective links 230, 232, 236, 238 and 240 are thus pivotally driven for causing vertical movement of the seat frame 242 relative to the support frame member 204 for adjusting the vertical position of the seat.

Furthermore, when the electric motor 318 is driven for adjusting the reclining position of the seat back, the driving torque is transmitted to the drive gear 316 via the gear train set forth above. Accordingly, the eccentric gear 312 is rotatingly driven for eccentrically driving the internal gear 310 of the back arm 306. As a result, the back arm 306 causes an angular displacement with the seat back 14. Therefore, adjustment of the seat back reclining position can be performed.

As can be seen from the discussion hereabove, in the present invention, the seat slide mechanism 100, the seat lifter mechanism 200 and the reclining mechanism 300 are concentrically arranged at positions along the side of the vehicular seat with concentration of the electric motors as driving means at one side of the seat. Particularly, as can be seen clearly from FIGS. 2 and 4, since all of the driving mechanisms for respective ones of the seat slide mechanism 100, the seat lifter mechanism 200 and the reclining mechanism 300 are placed within an essentially triangular space defined between the seat frame and the seat slide rail structure, the required space becomes small enough so that it may allow the seat cushion position to be satisfactorily lowered.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to a power seat arrangement, part of the shown embodiment is also applicable for a seat position adjusting system for manual operation. For instance, the seat slide structure is particularly applicable for the manually operable seat slide structure. FIGS. 24 through 26 show the seat slide mechanism adapted for manual operation. In the following disclosure of the shown manual seat slide mechanism, the structural elements corresponding to the elements disclosed in the former embodiment will be represented by the same reference numerals and the detailed discussion neglected in order to avoid redundant discussion. The shown manual seat slide structure is differentiated from the former embodiment in the absence of the electric motor powered seat slide drive mechanism and in the presence of the seat slide lock structure 400 with a lock release handle 402. As can be seen, the seat slide lock structure 400 comprises a plurality of locking holes 404 formed through the lower rail 106 and a locking pawl 406 which is rigidly secured on an actuation rod 408. In order to normally establish locking engagement between the locking pawl 406 and the locking hole 404, the actuation rod 408 is resiliently biased in a locking direction by means of a locking spring 410. In the shown embodiment, the locking spring 410 comprises a torsion spring.

The actuation rod 408 is disposed within the internal space of the seat slide rail structure defined between the upper and lower rails 104 and 106 and rotatably supported therein by means of a support bracket 412 secured on the upper rail.

The seat slide rail structure in this example is substantially the same as that of the former embodiment and establishes three points of support between the upper and lower rails 104 and 106 by the resin slider 116 and the roller bearing 118. Therefore, even when the shown seat slide rail structure is applied to the manual seat slide structure, it still allows smooth movement of the upper rail relative to the lower rail.

We claim:

1. An adjustable automotive seat arrangement including a seat cushion and a seat back comprising:

a seat slide mechanism associated with said seat cushion for permitting axial shifting in forward and rearward directions, said seat slide mechanism including a seat slide rail structure having a stationary rail secured to a vehicular body structural member and a movable rail slidingly engaged with said stationary rail and secured to a structural member of said seat cushion, said movable rail being associated with a first driving means for driving said movable rail relative to said stationary rail;

a seat lifter mechanism associated with said seat cushion for adjusting the height position of said seat cushion, said seat lifter mechanism including a stationary framework connected to a seat cushion frame of said seat cushion via a link mechanism, said seat lifter mechanism including a second driving means associated with said link mechanism for driving the link mechanism for causing vertical movement of said seat cushion frame relative to said stationary framework;

said second driving means being mounted on said movable rail of said seat slide; and all drive means being placed in an essentially triangular space defined between the seat frame and the seat slide rail structure and arranged along the side of the seat with concentration of said drive means at one side thereof for allowing said seat cushion to be satisfactorily lowered.

2. An adjustable automotive seat arrangement as set forth in claim 1, wherein said link mechanism comprises a first link mechanism associated with a front portion of said seat cushion and a second link mechanism associated with a second portion of said seat cushion, and said second drive means comprises a first component associated with said first link mechanism and a second component associated with said second link mechanism, said first and second components being oriented in alignment along said movable rail.

3. An adjustable automotive seat arrangement as set forth in claim 2, wherein each of said first and second components comprises an electric motor, a screw shaft associated with said electric motor to be rotatingly driven by the driving force of the latter and extending in a parallel relationship with said movable rail and a movable nut drivingly associated with the corresponding one of said first and second link mechanisms and engaging with said screw shaft to be driven by the rotation thereof.

4. An adjustable seat arrangement as set forth in claim 3, wherein each of said first and second mechanisms comprises a first link member pivotally connected to said movable nut at one end, a second link member pivotally connected to the seat cushion frame at one end, a third link members pivotably connected to respective ones of the other ends of said first and second link members, said first, second and third link members being so combined as to convert the thrusting movement of said movable nut along said screw shaft into a vertical movement of said seat cushion.

5. An adjustable automotive seat arrangement as set forth in claim 4, wherein said seat slide mechanism includes a threaded shaft secured to said movable rail and disposed within the internal space between said movable rail and said stationary rail, a stationary block having a gear element having gear teeth meshing with said threaded shaft and a power train for transmitting rotational driving torque of said first driving means to said gear element for rotatingly driving the latter.

6. An adjustable automotive seat arrangement as set forth in claim 4, wherein said seat slide rail structure including means for establishing a three point support for slidingly supporting said movable rail on said stationary rail for smooth sliding movement of said movable rail relative to said stationary rail.

7. An adjustable automotive seat arrangement as set forth in claim 6, wherein said movable rail and said stationary rail are provided with overlapping sections extending along both lateral sides, and said three point support is established by means of a roller bearing contacting with mating faces of said movable rail and said stationary rail and low frictional sliders disposed between said movable and stationary rails at said overlapping sections.

8. An adjustable automotive seat arrangement as set forth in claim 7, wherein at least one of said movable and stationary rails is provided with stopper projections for restricting range of motion of said roller bearings.

9. An adjustable automotive seat arrangement as set forth in claim 8, wherein first and second roller bearings are disposed between said movable and stationary rails and said stopper projections comprise a first pair of projections associated with said first roller bearing for restricting motion range of said first roller bearing within a predetermined range within a front half of said stationary rail and a second pair of projections associated with said second roller bearing for restricting motion range of said second roller bearing within a predetermined range within a rear half of said stationary roller.

10. An adjustable automotive seat arrangement as set forth in claim 3, wherein said electric motors associated with said lifter mechanism can be operated in synchronism or independently.

11. An adjustable automotive seat arrangement as set forth in claim 3, wherein a horizontal portion of a motor receptacle space defined by said stationary frame member is raised at two portions thereof for forming motor supports.

* * * * *

UNITED STATES PATENT AND TRADEMARK OFFICE
CERTIFICATE OF CORRECTION

PATENT NO. : 5,121,895

DATED : June 16, 1992

INVENTOR(S) : Isao IKEGAYA et al.

It is certified that error appears in the above-identified patent and that said Letters Patent is hereby corrected as shown below:

Title page, item [30], should read as follows:
--Feb. 27, 1989 [JP] JAPAN  1-21887[U]--

Signed and Sealed this

Fourteenth Day of September, 1993

*Attest:*

BRUCE LEHMAN

*Attesting Officer*  *Commissioner of Patents and Trademarks*